C. BORNMANN.
PHOTOGRAPHIC CAMERA.
APPLICATION FILED JAN. 12, 1912.
1,029,268.
Patented June 11, 1912.
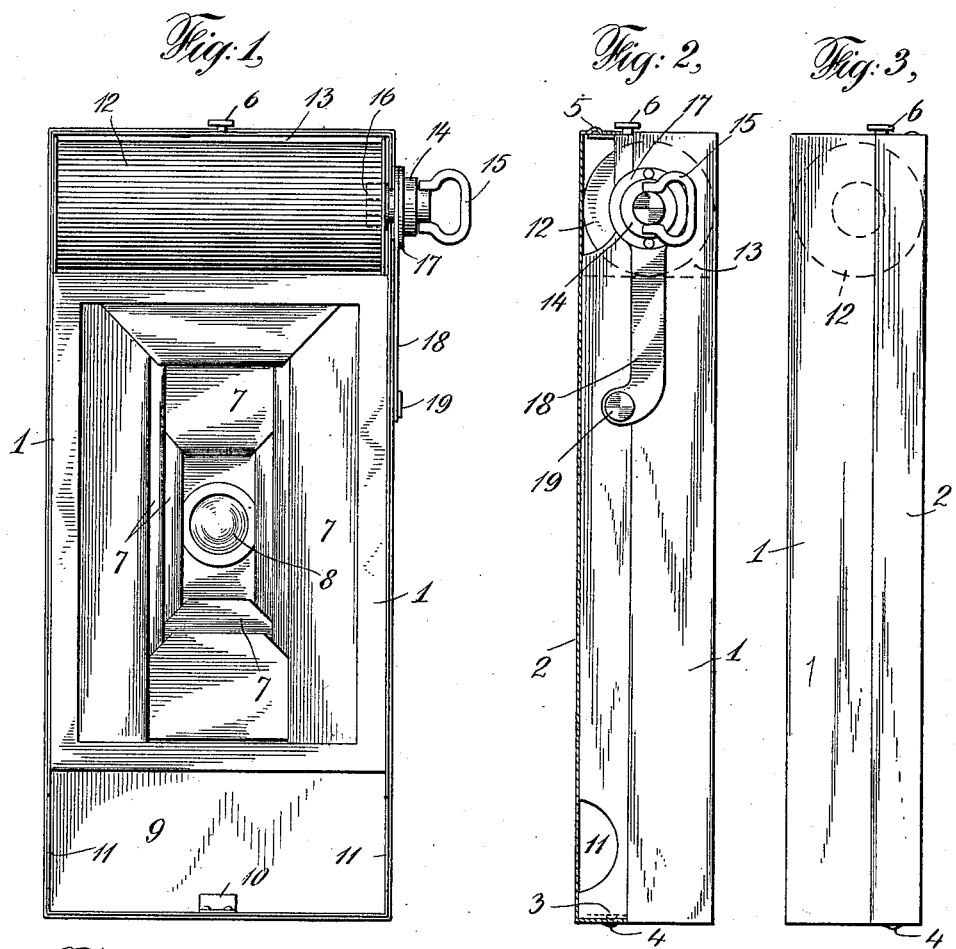
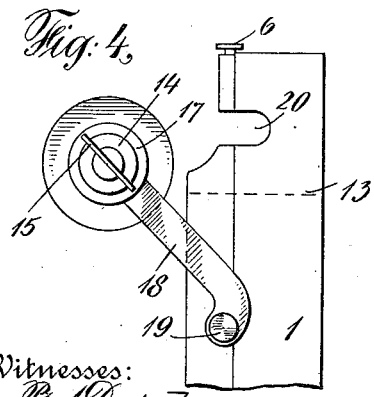
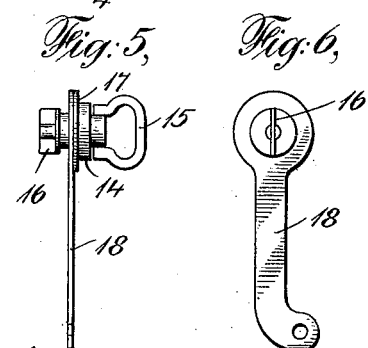
Witnesses:
Max B. A. Doring.
F. M. Donsbach.
Carl Bornmann Inventor
By his Attorney
Phillips Abbott

UNITED STATES PATENT OFFICE.

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,029,268.  Specification of Letters Patent.  Patented June 11, 1912.

Application filed January 12, 1912. Serial No. 670,910.

*To all whom it may concern:*

Be it known that I, CARL BORNMANN, a citizen of the United States, and a resident of the city of Binghamton, county of Broome, State of New York, have invented certain new and useful Improvements in Photographic Cameras, of which the following is a full, clear, and exact description.

It is the purpose of this invention to provide a combined winding key and spool support, intended more especially for use in cameras, the bodies of which are made of thin material, as, for example, metal, now extensively used. It is well adapted, however, for use in cameras of other constructions.

According to this invention the winding key is supported upon a pivoted arm adapted to swing outwardly from the camera, taking the spool with it, when the camera is opened, thus greatly facilitating the insertion and removal of the spool and automatically guiding it into the chamber prepared for it in the camera and avoiding the necessity for withdrawing the winding key laterally for the insertion and removal of a spool, which construction would be inconvenient in a thin-walled camera box.

Referring to the drawings, Figure 1 illustrates an elevation of the interior of the camera, taken from the back, the cover being removed, and showing the parts constituting the invention in position for use therein; Fig. 2 illustrates a view of the side of the camera, the cover being in section, also showing the parts in position for use; Fig. 3 illustrates a view similar to Fig. 2, but showing the opposite side of the camera, the cover being intact and in place; Fig. 4 illustrates a view showing the parts constituting the invention in position when the winding key is swung outwardly for the removal or insertion of a spool; Fig. 5 illustrates a detailed view of the winding key and supporting arm; Fig. 6 illustrates an elevation, taken from the left, of that which is shown in Fig. 5.

In the drawings, 1 represents the body part of the camera box, 2 the cover therefor, which fits upon its rear or back side. These two parts may be held together in any preferred manner. A convenient method is to provide little projections 3, on the body part, which enter little sockets 4, made in the cover and at the opposite end a similar socket construction 5, together with a depressing thumb piece 6, to be pressed upon when it is desired to unite or separate the parts.

7 is, or may be, an ordinary bellows construction, and 8 the lens.

The parts above referred to may be of any preferred construction.

9 is a suitable chamber for the reception of the stockspool, not shown. It is provided with the usual friction spring 10 to retard and assure the smooth unwinding of the film. I prefer to cut out notches 11 in the end walls of this chamber for convenience in inserting and removing the spool. In the case shown no journals are required for the stockspool.

12 is the winding or receiving spool which also, in the case shown, does not require any fixed journal. It simply revolves in the chamber 13 made for its reception in the camera.

14 is the winding key. I show it with a folding thumb piece 15 and cross bar 16 and it has suitable devices (not shown) inclosed in a small casing 17, which preclude backward turning of the key. This winding mechanism is mounted upon the free end of an arm 18 which is pivoted at 19 to the body part of the camera. The cross bar 16 is adapted to enter a saw kerf, or other recess, made in the spindle of the spool, as usual.

20 is a notch cut in the side of the camera box, which snugly fits an appropriate part of the winding key, so as to sustain the same, acting in part as a journal therefor.

The operation is as follows: To load the camera, the cover 2 is removed, the stockspool is placed in the chamber 9 at the lower end of the camera, the black paper of the cartridge is led across the focal plane and connected to the winding spool, all in the usual manner. The winding key is then swung outwardly from its position, shown best in Figs. 1 and 2, to that shown in Fig. 4, and the cross bar 16 thereof, or other appropriate part, is properly engaged in a suitable recess, or its equivalent, made in the spindle of the winding spool which is then dropped into the chamber 13 at that end of the camera, made for its reception, the winding key being swung back into the position shown in Figs. 1 and 2, as the winding spool passes into the chamber, until finally the winding key will enter the notch 20 (see Fig. 4) made in the side of the camera for its reception, and the spool will rest fully within the chamber and be adapted to rotation therein. The cover 2 is then replaced and the camera is ready for use. After the exposures have all been made, the exposed film now entirely wound from the stockspool on to the winding spool, may be removed from the camera by swinging the winding key and arm 18 outwardly, the operator, while so doing, supporting and guiding the opposite end of the winding spool, so that it shall move smoothly outwardly as the other end engaged by the winding key is swung outwardly.

I claim:

1. In a camera, an arm pivoted at one end to the camera, and a winding key connected to the free end of the arm adapted to be swung outwardly from the camera with the arm.

2. In a camera, a chamber for the reception of the winding spool, an arm pivoted at one end to the camera, its free end adapted to register with one end of said chamber, and a winding key connected to the free end of the arm adapted to be swung into and out of registration with the end of the chamber with said arm.

3. In a camera, a chamber for the reception of the winding spool, having a notch in one of its end walls adapted to act as a journal for the winding key, an arm pivoted at one end to the camera, its free end adapted to register with said notch, a winding key connected to the free end of the arm and adapted to be swung into and out of registration with said notch by appropriate movement of said arm.

In testimony whereof I have signed my name to this specification in the presence of two subscribing witnesses.

CARL BORNMANN.

Witnesses:
GEO. W. TOPLIFF,
H. P. MOXON.

Copies of this patent may be obtained for five cents each, by addressing the "Commissioner of Patents, Washington, D. C."